Sept. 27, 1955          S. C. ROTH          2,718,833

CAMERA CASE WITH HOOD

Filed Sept. 28, 1954

INVENTOR

Samuel C. Roth

United States Patent Office 2,718,833
Patented Sept. 27, 1955

2,718,833

CAMERA CASE WITH HOOD

Samuel C. Roth, Allentown, Pa.

Application September 28, 1954, Serial No. 458,841

5 Claims. (Cl. 95—47)

This invention relates to novel and useful improvements in camera cases, particularly for reflex type cameras of compact design type. The invention relates to cases having displaceable covers that may serve as auxiliary light shields over the inadequate hoods generally fitted to reflex cameras of the type described.

An object of the invention is to provide a case, for carrying and protecting a reflex type camera of compact design normally characterized by irregular configuration and a lack of unobstructed plane surfaces, that incorporates a combination cover for the usual opening in the top of the case receptacle portion which is adaptable to an auxiliary hood by means of an extensible frame that permits raising and positioning the cover over the extended or erected hood of an encased camera.

Another object is to provide a cover for such a case, having a vision opening of restricted aperture which will be in visual alignment with the viewer image within the hood of an encased camera when the cover is used as an auxiliary light shield or hood, the cover having a differential level configuration to permit raising the viewer aperture thus to insure proximity of an eye when viewing the image.

Other objects such as simplicity and adaptability will become apparent from the following description and explanation:

Of the drawings.

Figure 2:
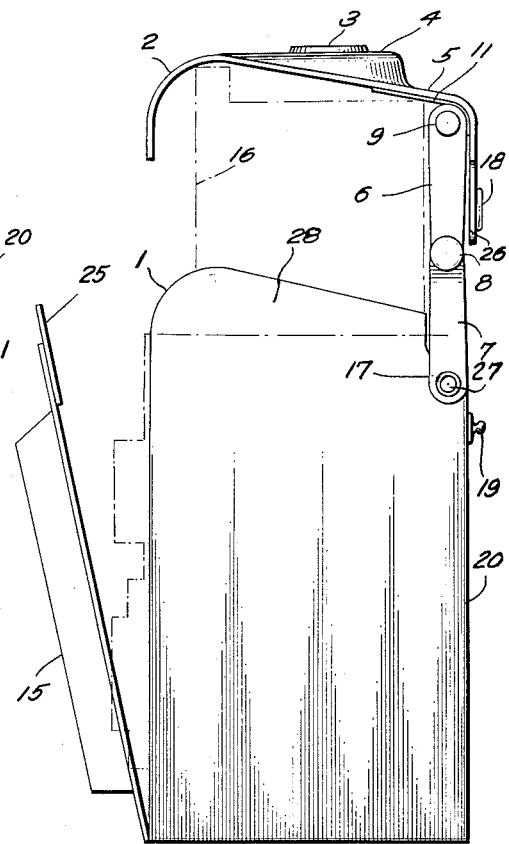
Figure 2 is an elevational view of the case of Figure 1, the cover being raised by means of an extensible frame thus forming an auxiliary hood for an erected camera hood shown in phantom.

The instant invention is adaptable for use in connection with various types of conventional reflex cameras of the compact variety including single and twin lens models. The type outlined in phantom in Figure 2 is a twin lens model. The shape of the camera is immaterial since the case receptacle portion 1 will be proportioned to cover its particular camera substantially, with the exception of an open top or a top opening for erection of the hood of the camera, and the case will also usually follow the configuration of the camera body. In the majority of instances openings, which are not shown since their positions may vary greatly in different cameras, will be cut into the sides of the receptacle portion 1 for permitting control knobs and the like to protrude. Also one side of a typical case will generally be hingedly attached, or omitted altogether, so that it can be swung open in order that lens and shutter equipment of the camera may be exposed for picture taking. Thus side 15 is shown partly open and independent of cover 2 in Figure 2, to illustrate this point.

Figure 1:
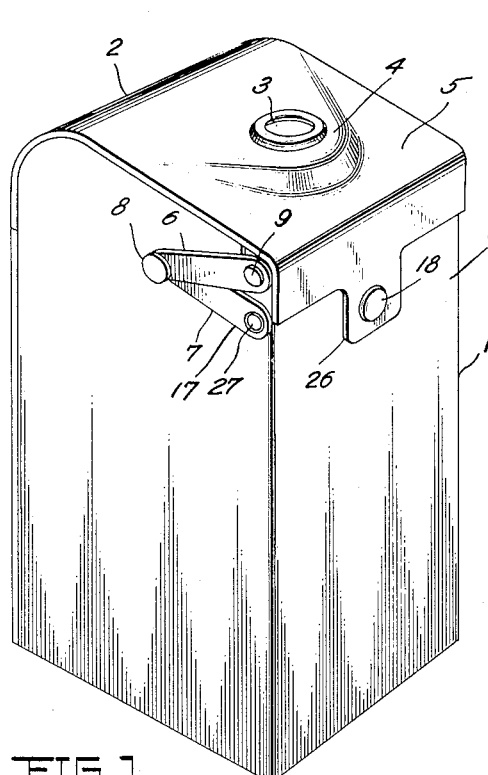
Figure 1 is a perspective view of a typical camera case.

The case receptacle portion 1, shown in Figures 1 and 2, consists of a bottom 30 to which are attached the fixed sides 20, 28 and a substantially identical side not shown, as well as the swingable side 15.

Figure 3:
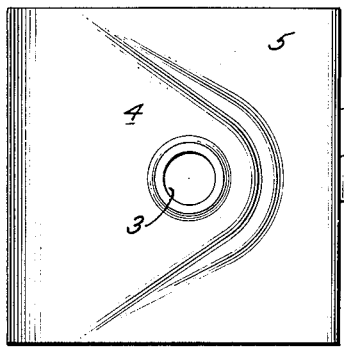
Figure 3 is a top view of the cover only of the case of Figures 1 and 2.
Figure 4:
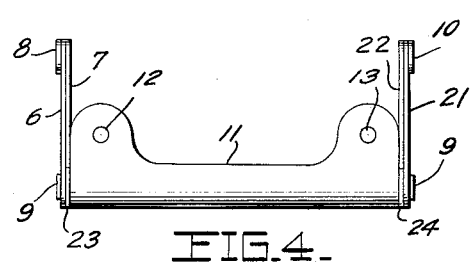
Figure 4 is a top view of a hinged extensible frame shown folded and closed in Figure 1 and extended in Figure 2.
Figure 5:
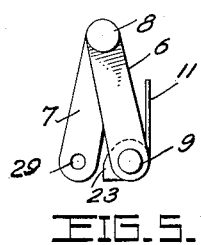
Figure 5 is an end elevational view of the frame of Figure 4.

The combination cover for the receptacle portion which also serves as an auxiliary hood is designated by the number 2 and is shown in its closed position in Figure 1 and in its displaced or hood position in Figure 2. Its top configuration is best illustrated in Figure 3. The cover 2 consists of a main panel 5 which is higher in the front than the rear in the present instance to clear the front of the average camera hood designated as 16 and shown in phantom in Figure 2. The panel 5 has a rounded depending forward edge and a rear rounded depending edge best shown in Figure 2, both primarily for the purpose of streamlining and enhancing the appearance of the case. The cover 2 is characterized further by two planes, one the cover proper 5 and, two, the raised portion 4 surrounding and thus raising the vision opening 3 above the level of plane 5. Attached to the rear of the cover 2 is the tab 26 having the fastener 18, which when the cover is in its normally closed position, snaps over the button 19 of the receptacle portion to securely close the case. Also, in the present instance, when the cover 2 is lowered to its normally closed position shown in Figure 1, the forward depending portion of panel 5 will slide over the tip of tab 25 of the swingable side 15 to hold it in its closed position.

In order to raise and position the cover 2 over an erected camera hood 16 and also to align it in its normally closed position, a restrictively contractable extensible frame 17 shown in Figures 1, 2, 4 and 5 is employed. This hinge frame consists of a plate 11 which has suitably placed rivet holes 12 and 13 for fastening it to the cover 2. At the opposite ends of the plate 11 are the pierced tabs 23 and 24 from which are swung the arms 6 and 21, which are pivotally held in fixed relationship to each other by means of the moveable pivot bar 9 to which the arms 6 and 21 are rigidly attached. To these arms 6 and 21 are hinged the arms 7 and 22 respectively by means of semi tight rivets 8 and 10 to permit hinge motion between the arm assembly 6, 9 and 21 and the arms 7 and 22. In order to attach the frame 17 and consequently the cover 2 to the receptacle portion of the case, the arms 7 and 22 are also attached at their opposite ends to the case receptacle portion 1, substantially as shown in Figures 1 and 2, by means of pivot pins 27 running through two holes 29, and which pivot pins are suitably anchored to the receptacle portion sides. The fixed positioning of the pivot points restricts frame movement to insure open positioning of the cover to form an auxiliary hood, as well as closed complemental joining of the cover to the receptacle portion for camera protection. The extended height of the frame 17 should be sufficient to raise the cover over an erected camera hood and the length of the arms should accordingly be determined by individual hood design.

The operation of the invention can best be described as follows: In Figure 1 the cover is lowered and closed by folding the hinged extensible frame 17, thus bringing the cover into close contact with the top of the receptacle portion which it complements as nearly as possible with respect to mating edges in order to protect the encased camera. To open, the snap fastener is released, the hinged frame elements extended as in Figure 2, and the forward portion of the cover 2 is permitted to rest upon the erected camera hood 16. By using semi-tight rivets or similar means for the pivot joints 8, 10 and 27, the extensible frame 17 will be rigid enough to keep the auxiliary hood 2 and the vision opening 3 in position and alignment over the camera hood and viewer. Use of the auxiliary hood thus formed becomes fairly obvious since the difference in levels between the panels 4 and 5 will permit proximity of an operator's eye when viewing by providing clearance for his nose which should rest against panel 5. The overall proximity thus permitted will aid in eliminating practically all extraneous light by utilizing operator's head as a final light shield.

Having described the invention, what is claimed as new is:

1. In a case for a reflex type camera of compact design normally characterized by irregular configuration and a lack of unobstructed plane surfaces; a receptacle portion of substantially the same proportions and configuration as the particular camera body to be encased within it, consisting of a bottom panel with side panels attached thereto, said receptacle portion having a top opening for exposing a top disposed camera viewer; a complemental cover for the top opening comprising a backward and downward sloping top panel, a vision opening of restricted aperture requiring proximity of an eye when viewing in said cover and in visual alignment with said camera viewer, and a raised section of the top panel adjacent to and surrounding said vision opening for elevating same whereby to permit proximity of an eye when viewing; and a hinged normally folded extensible frame complementally joining the cover to the receptacle portion for camera protection, said frame having an open or extended height sufficient to raise said cover over an erected camera hood to form an auxiliary hood for the camera viewer.

2. In a case for a reflex type camera of compact design normally characterized by irregular configuration and a lack of unobstructed plane surfaces; a receptacle portion of substantially the same proportions and configuration as the particular camera body to be encased within it, consisting of a bottom panel with side panels attached thereto, said receptacle portion having an open top for exposing a top disposed camera viewer; a complemental cover for the open top consisting of a backward and downward sloping top panel having front and rear side panels depending therefrom of length complemental to corresponding sides of the receptacle portion, a vision opening of restricted aperture requiring proximity of an eye when viewing in said cover and in visual alignment with said camera viewer, and a raised section of the top panel adjacent to and surrounding said vision opening for elevating same whereby to permit proximity of one eye when viewing; and a hinged normally folded extensible frame complementally joining the cover to the receptacle portion for camera protection, said frame having an open or extended height sufficient to raise said cover over an erected camera hood to form an auxiliary hood for the camera viewer.

3. In a case for a reflex type camera of compact design normally characterized by irregular configuration and a lack of unobstructed plane surfaces: a receptacle portion substantially enclosing the particular camera body to be encased within it comprising a bottom panel having side panels attached thereto, said receptacle portion having an open top for exposing a top disposed camera viewer; a complemental differential level cover for the open top, a vision opening in said cover in visual alignment with said camera viewer of restricted aperture requiring proximity of an eye when viewing, said vision opening being disposed within a suitably elevated section of the cover to provide nose clearance for insuring eye proximity; and a hinged normally folded extensible frame complementally joining the cover to the receptacle portion for camera protection, said frame having an open or extended height sufficient to raise said cover over an erected camera hood to form an auxiliary hood for the camera viewer.

4. In a case for a reflex type camera of compact design normally characterized by irregular configuration and a lack of unobstructed plane surfaces; a receptacle portion substantially enclosing the particular camera body to be encased within it comprising a bottom panel having side panels attached thereto, said receptacle portion having an open top for exposing a top disposed camera viewer; a complemental differential level cover for the open top, a vision opening in said cover in visual alignment with said camera viewer of restricted aperture requiring proximity of an eye when viewing, said vision opening being disposed within a suitably elevated section of the cover to provide nose clearance for insuring eye proximity; and an extensible frame hingedly joining said cover to the receptacle portion, said frame having an extended height sufficient to raise the cover over an erected camera hood to form an auxiliary hood for the camera viewer, said frame also being restrictively contractable for complementally joining the cover to the receptacle portion for camera protection.

5. In a case for reflex type cameras of compact design normally characterized by irregular configuration and a lack of unobstructed plane surfaces; a receptacle portion substantially enclosing the particular camera body to be encased within it comprising a bottom panel having side panels attached thereto, said receptacle portion having a top opening for exposing a top disposed camera viewer; a complemental differential level cover for the top opening, a vision opening in said cover in visual alignment with said camera viewer of restricted aperture requiring proximity of an eye when viewing, said vision opening being disposed within a suitably elevated section of the cover to provide nose clearance for insuring eye proximity; and an extensible frame joining said cover to the receptacle portion, said frame having an extended height sufficient to raise the cover over an erected camera hood to form an auxiliary hood for the camera viewer, said frame also being restrictively contractable for complementally joining the cover to the receptacle portion for camera protection.

References Cited in the file of this patent

UNITED STATES PATENTS

| | | |
|---|---|---|
| 2,482,248 | Coon | Sept. 20, 1949 |
| 2,634,661 | Roth | Apr. 14, 1953 |
| 2,681,600 | Heidecke | June 22, 1954 |